United States Patent
Huang et al.

(10) Patent No.: US 9,774,285 B2
(45) Date of Patent: Sep. 26, 2017

(54) VOLTAGE SENSE CONTROL CIRCUIT, VOLTAGE SENSE CONTROL DRIVING CIRCUIT AND DRIVING METHOD FOR PERMANENT MAGNET SYNCHRONOUS MOTOR

(71) Applicant: Silergy Semiconductor Technology (Hangzhou) LTD, Hangzhou, ZheJiang Province (CN)

(72) Inventors: Xiaodong Huang, Hangzhou (CN); Xinghao Zhang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 15/200,815

(22) Filed: Jul. 1, 2016

(65) Prior Publication Data
US 2017/0040921 A1   Feb. 9, 2017

(30) Foreign Application Priority Data
Aug. 4, 2015   (CN) .......................... 2015 1 0468621

(51) Int. Cl.
*H02P 23/14*   (2006.01)
*H02P 6/182*   (2016.01)
*H02P 6/17*   (2016.01)

(52) U.S. Cl.
CPC ............... *H02P 6/182* (2013.01); *H02P 6/17* (2016.02); *H02P 23/14* (2013.01)

(58) Field of Classification Search
CPC ............. H02P 6/182; H02P 6/17; H02P 23/14

USPC .......... 318/700, 599, 400.01, 300.34, 400.32, 318/400.26
See application file for complete search history.

(56) References Cited

U.S. PATENT DOCUMENTS

| | | | | |
|---|---|---|---|---|
| 5,384,527 A | * | 1/1995 | Rozman | F02N 11/04 318/254.2 |
| 5,461,293 A | * | 10/1995 | Rozman | F02N 11/04 318/603 |
| 5,982,117 A | * | 11/1999 | Taylor | H02P 25/089 318/254.1 |

(Continued)

OTHER PUBLICATIONS

Zhao Hong-Tao, Song Qing-Guo, Comparison and Improvement of Observers for the BEMF of PM BLDCM, eMotorcn, Nov. 27, 2014, pp. 6-9, vol. 42, No. 11.

*Primary Examiner* — Rita Leykin
(74) *Attorney, Agent, or Firm* — Michael C. Stephens, Jr.

(57) ABSTRACT

A driving circuit of a PMSM can include: a current sampling circuit that obtains a current sampling signal by sampling a rotor current of one phase of the PMSM; a sliding mode estimating circuit that receives the current sampling signal and a voltage sampling signal that represents a rotor voltage of the phase, estimates a back electromotive force information of the phase, and generates a first voltage signal that represents the back electromotive force information; a speed computing circuit that receives the first voltage signal, and generates an angular velocity signal that represents rotor cycle information; and a PWM control circuit that generates a PWM control signal according to the angular velocity signal, where the PWM control signal controls the turn on/off of switches in a three-phase inverter, to control an operating current of the PMSM to be a sine wave current.

11 Claims, 5 Drawing Sheets

(56) References Cited

U.S. PATENT DOCUMENTS

| | | | | |
|---|---|---|---|---|
| 6,069,467 A * | 5/2000 | Jansen | H02P 6/183 | 318/801 |
| 6,388,416 B1 * | 5/2002 | Nakatani | H02P 6/085 | 318/700 |
| 6,462,491 B1 * | 10/2002 | Iijima | H02P 9/18 | 318/400.09 |
| 6,563,286 B2 * | 5/2003 | Seki | H02P 6/22 | 318/431 |
| 6,700,343 B2 * | 3/2004 | Masaki | H02P 6/18 | 318/434 |
| 6,869,272 B2 * | 3/2005 | Odachi | F04B 27/0895 | 417/42 |
| 7,598,698 B2 * | 10/2009 | Hashimoto | H02P 21/18 | 318/798 |
| 7,714,529 B2 | 5/2010 | Chen et al. | | |
| 7,898,197 B2 * | 3/2011 | Tomigashi | H02P 21/10 | 318/400.02 |
| 8,115,428 B2 * | 2/2012 | Williams | B62D 5/0481 | 318/400.02 |
| 8,174,222 B2 * | 5/2012 | Patel | B60K 1/02 | 318/400.01 |
| 8,362,759 B2 * | 1/2013 | Ha | H02M 7/53875 | 318/729 |
| 8,497,655 B2 * | 7/2013 | Liu | H02P 21/0007 | 318/400.01 |
| 8,624,532 B2 * | 1/2014 | Chuah | H02P 6/18 | 318/400.01 |
| 9,071,181 B2 * | 6/2015 | Yersin | H02P 6/182 | |
| 9,088,241 B2 * | 7/2015 | Wu | H02P 21/13 | |
| 9,143,066 B2 * | 9/2015 | Yang | H02P 6/18 | |
| 9,317,019 B2 | 4/2016 | Huang | | |
| 9,401,673 B2 * | 7/2016 | Semura | H02P 6/10 | |
| 9,419,553 B2 * | 8/2016 | Nakai | H02P 21/06 | |
| 9,479,097 B2 * | 10/2016 | Kang | H02P 21/34 | |
| 9,479,106 B2 * | 10/2016 | Nakai | H02P 29/0038 | |
| 9,515,589 B2 * | 12/2016 | Kozaki | H02P 6/185 | |
| 9,531,313 B2 * | 12/2016 | Matsuki | H02P 21/06 | |
| 2007/0126386 A1 * | 6/2007 | Yunus | H02P 6/182 | 318/400.04 |
| 2017/0019043 A1 * | 1/2017 | Zhao | H02P 6/182 | |

* cited by examiner

VOLTAGE SENSE CONTROL CIRCUIT, VOLTAGE SENSE CONTROL DRIVING CIRCUIT AND DRIVING METHOD FOR PERMANENT MAGNET SYNCHRONOUS MOTOR

RELATED APPLICATIONS

This application claims the benefit of Chinese Patent Application No. 201510468621.7, filed on Aug. 4, 2015, which is incorporated herein by reference in its entirety.

FIELD OF THE INVENTION

The present invention generally relates to the field of motor control techniques, and more particularly to driving circuits and methods for a permanent magnet synchronous motor.

BACKGROUND

Permanent magnet synchronous motors of relatively light weight, small size, simple structure, and high power density have played an important role in, e.g., industrial and agricultural production, as well as other applications. With the development of permanent magnetic materials and power electronic devices, permanent magnet synchronous motors are becoming more widely used. For some applications, the system cost may be controlled to a maximum extent, so position "sensorless" techniques may be applied in order to reduce system costs because a normal position sensor (e.g., photoelectric coded disk, rotatable transformer, etc,) may be avoided. In some cases, vector control can be used in a position sensorless permanent magnet synchronous motor; however, such an approach may need an advanced processor in order to process the relatively complicated algorithm and heavy computational load.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In one embodiment, a driving circuit of a PMSM can include: (i) a current sampling circuit configured to obtain a current sampling signal by sampling a rotor current of one phase of the PMSM; (ii) a sliding mode estimating circuit configured to receive the current sampling signal and a voltage sampling signal that represents a rotor voltage of the phase, to estimate a back electromotive force information of the phase, and to generate a first voltage signal that represents the back electromotive force information; (iii) a speed computing circuit configured to receive the first voltage signal, and to generate an angular velocity signal that represents rotor cycle information; and (iv) a PWM control circuit configured to generate a PWM control signal according to the angular velocity signal, where the PWM control signal is configured to control the turn on and off of switches in a three-phase inverter, to control an operating current of the PMSM to be a sine wave current.

In one embodiment, a driving method for a PMSM can include: (i) generating a current sampling signal by sampling a rotor current of one phase of the PMSM; (ii) generating a first voltage signal that represents back electromotive force information of the phase based on the current sampling signal and a voltage sampling signal that represents a rotor voltage of the phase; (iii) generating an angular velocity signal that represents rotor cycle information based on the first voltage signal; and (iv) generating a PWM control signal according to the angular velocity signal to control the turn on and off of switches in a three-phase inverter, and to control an operating current of the PMSM to be a sine wave current.

Figure 1:
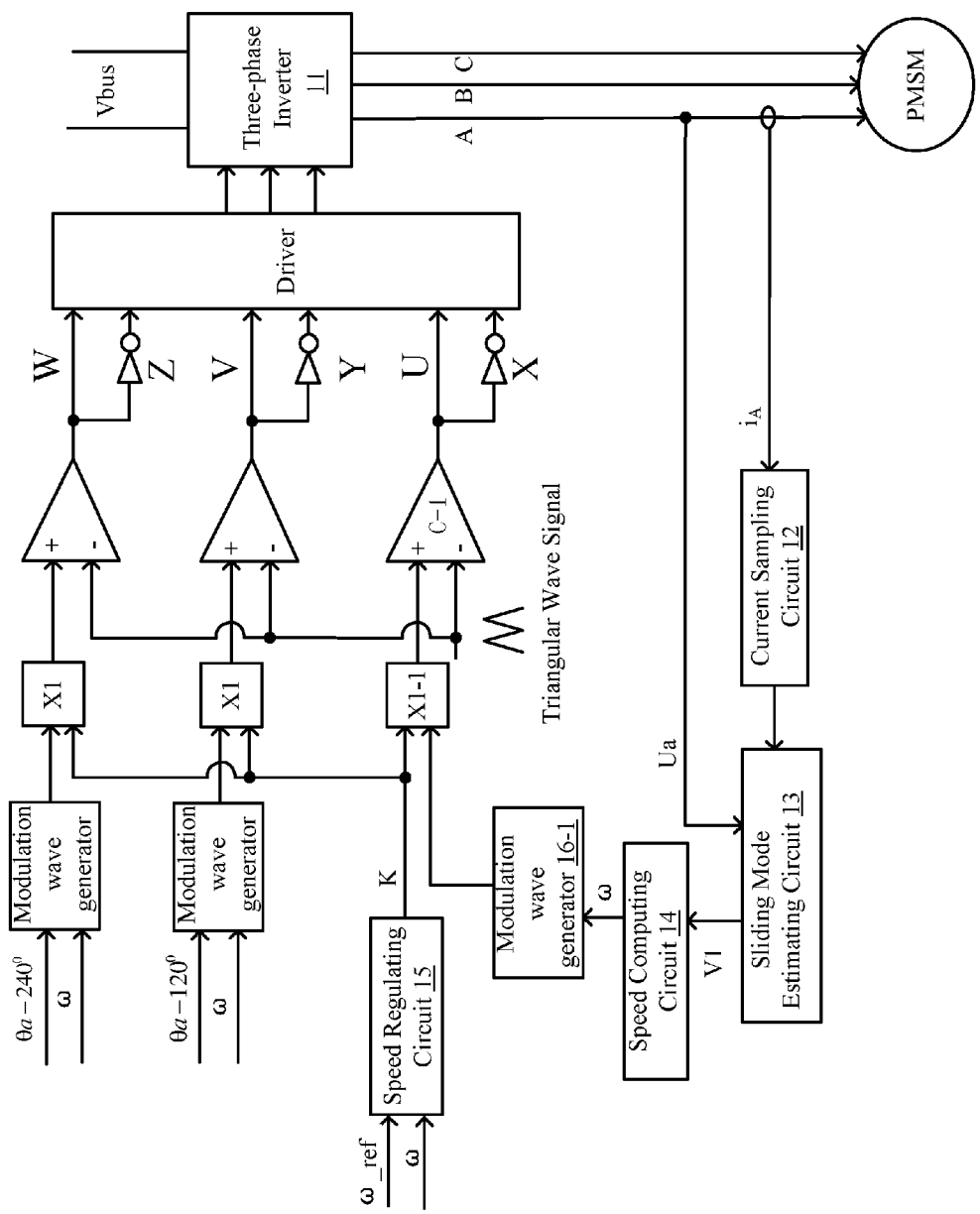
FIG. 1 is a schematic block diagram of a first example driving circuit for a permanent magnet synchronous motor, in accordance with embodiments of the present invention.

Referring now to FIG. 1, shown is a schematic block diagram of a first example driving circuit for a permanent magnet synchronous motor, in accordance with embodiments of the present invention. In this particular example, three-phase inverter 11 can receive external voltage signal Vbus, and may generate three phase alternating voltage signals to a permanent magnet synchronous motor (PMSM). A driver can generate pulse-width modulation (PWM) control signals to control the operating states of switches in the inverter of the PMSM in accordance with the rotor position information, so as to control an operating current of the PMSM. As shown in FIG. 1, three-phase inverter 11 may output three alternating voltage signals as A, B, and C.

In this example, the driving circuit may include current sampling circuit 12, sliding mode estimating circuit 13, speed computing circuit 14, and a PWM control circuit. Current sampling circuit 12 can generate current sampling signal $i_A$ by sampling a current through a rotor of one phase (e.g., phase A) of the PMSM. Sliding mode estimating circuit 13 can receive current sampling signal $i_A$ and voltage sampling signal Ua that represents a voltage of the same phase, and may generate voltage signal V1 (e.g., a sine wave signal) that represents the back electromotive force. In this example, voltage sampling signal Ua may be obtained by directly sampling a voltage of a corresponding phase (e.g., phase A). Speed computing circuit 14 can receive voltage signal V1, and may generate angular velocity signal ω that represents the cycle information of the rotor.

Figure 2:
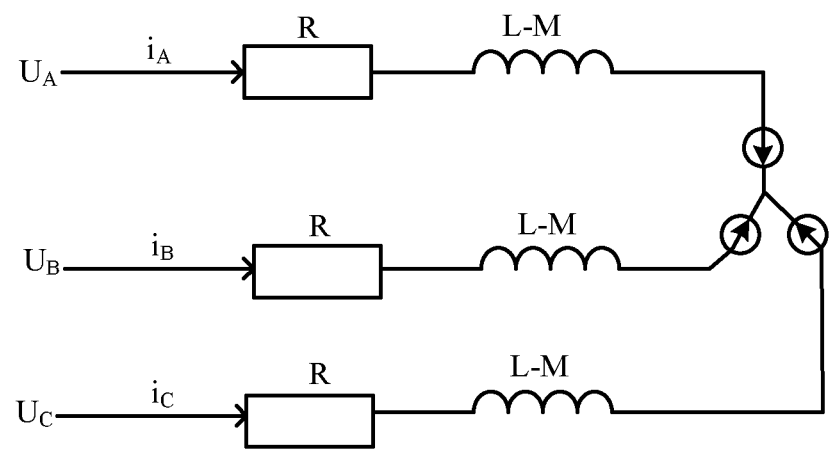
FIG. 2 is an equivalent model of a permanent magnet synchronous motor, in accordance with embodiments of the present invention.

Referring now to FIG. 2, shown is an equivalent model of a permanent magnet synchronous motor, in accordance with embodiments of the present invention. The following may introduce the procedure of estimating the back electromotive force information by sliding mode estimating circuit 13. In FIG. 2, voltages across the rotor windings of phases A, B and C may be obtained as:

$$\begin{pmatrix} u_A \\ u_B \\ u_C \end{pmatrix} = \begin{pmatrix} R & 0 & 0 \\ 0 & R & 0 \\ 0 & 0 & R \end{pmatrix} \begin{pmatrix} i_A \\ i_B \\ i_C \end{pmatrix} + \begin{pmatrix} L-M & & \\ & L-M & \\ & & L-M \end{pmatrix} p \begin{pmatrix} i_A \\ i_B \\ i_C \end{pmatrix} + \begin{pmatrix} e_A \\ e_B \\ e_C \end{pmatrix}$$

Here, $u_A$, $u_B$, $u_C$ can denote voltages (V) across the stator windings of phases A, B, and C, $i_A$, $i_B$, $i_C$ can denote currents (A) through stator windings of phases A, B, and C, $e_A$, $e_B$, $e_C$ can denote back electromotive force (V) of stator windings of phases A, B, and C, R may denote the phase resistance of the motor, L can denote the self-inductance (H) of each phase winding, M can denote the mutual inductance (H) between every two phase windings, and "p" can denote the differential operator, p=d/dt.

The following may describe the phase voltage and the phase current of the phase A as examples, and the phase voltage of the phase A can be obtained according to the above described arrays:

$$u_A = Ri_A + (L-M)pi_A + e_A \quad (1)$$

Substituting p=d/dt to equation (1), the differential equation of the phase current $i_A$ can be:

$$\frac{di_A}{dt} = -\frac{R}{L-M}i_A + \frac{u_A}{L-M} - \frac{1}{L-M}e_A \quad (2)$$

In order to estimate the back electromotive force $e_A$, the sliding mode estimating circuit 13 may employ a sliding mode controller and/or observer, in order to establish simulation calculation.

Sliding mode surface S may be selected as: S=î-i, where î can denote the estimation value of the sliding mode observer, and "I" may denote the practical phase current value. The sliding mode observer may be implemented according to the equivalent circuit equation of the motor and the sliding mode surface:

$$\frac{d\hat{i}_A}{dt} = -\frac{R}{L-M}\hat{i}_A + \frac{u_A}{L-M} - \frac{1}{L-M}\text{sign}(\hat{i}_A - i_A) \quad (3)$$

As shown in equation (3), "sign" is the switch function:

$$\text{sign}(x) = \begin{cases} k, & x \geq 0 \\ -k, & x < 0 \end{cases}$$

When k is larger than or equal to the amplitude of the absolute value of $e_A$, equation (3) is true, and subtracting equation (2) from equation (3) may obtain:

$$\frac{d(\hat{i}_A - i_A)}{dt} = -\frac{R}{L-M}(\hat{i}_A - i_A) + \frac{e_A}{L-M} - \frac{1}{L-M}\text{sign}(\hat{i}_A - i_A) \quad (4)$$

When the system enters the sliding mode surface, that is S=î-i→0, so equation (5) can be obtained from equation (4):

$$e_A = \text{sign}(\hat{i}_A - i_A) \quad (5)$$

It can be seen from equation (5) that back electromotive force $e_A$ can be represented by a function sign, and the rotor position information may be obtained according to back electromotive force $e_A$. Those skilled in the art will recognize that back electromotive force $e_A$ is a step value obtained according to the switch function, and may be converted to a sine wave signal through a low-pass filter.

Figure 3:
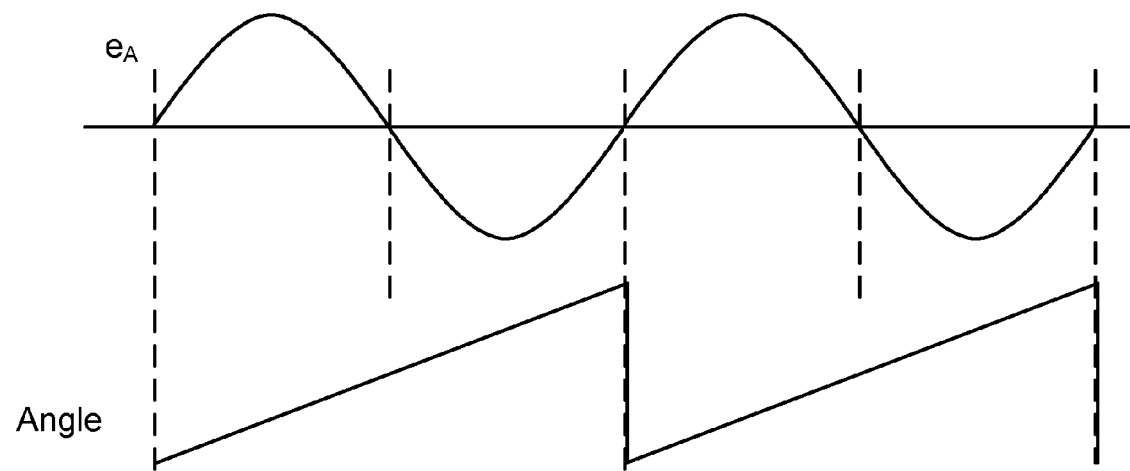
FIG. 3 is a waveform diagram of an example relationship between back electromotive force and rotor position information of phase A, in accordance with embodiments of the present invention.

Referring now to FIG. 3, shown is a waveform diagram of an example relationship between the back electromotive force and rotor position information of phase A, in accordance with embodiments of the present invention. As shown, the interval that the angle changes from 0 to 2n is set as one sine wave cycle of back electromotive force $e_A$. Speed computing circuit 14 may generate angular velocity signal ω that represents the cycle information of the rotor. When the motor is in a steady operating state, the back electromotive force can be a complete sine wave in every operating cycle, so the angular velocity of the motor may be calculated according to the sine wave cycle.

In this example, the PWM control circuit may include speed regulating circuit 15 and three PWM control sub-circuits. Each PWM control sub-circuit may include a modulation wave generator, a multiplication circuit, and a switching signal generator. As shown in the example of phase A in FIG. 1, the PWM control sub-circuit may include modulation wave generator 16-1, multiplication circuit X1-1, and switching signal generator C-1. Speed regulating circuit 15 can receive angular velocity signal ω and reference angular velocity signal ω_ref, and may generate proportion signal K. Modulation wave generator 16-1 can receive angular velocity signal ω, and may generate a first U-shaped modulation wave, which can be a half U-shaped wave, and angular velocity signal ω may be used to determine the cycle of the first U-shaped modulation wave.

Multiplication circuit X1-1 can receive the first U-shaped modulation wave and the proportion signal K, and may generate a second U-shaped modulation wave. Switching signal generator C1-1 can receive the second U-shaped modulation wave and a triangular wave signal, and may generate a PWM control signal for phase A. Speed regulating circuit 15 can be a proportional-integrator (PI) regulator. Proportion signal K may be used to regulate the amplitude of the first U-shaped modulation wave, such that the amplitude of the second U-shaped modulation wave may be obtained, and a duty cycle control signal may be subsequently obtained by comparison. The triangular wave signal may be provided by an external triangular wave generator.

The phase difference between every two phases of the three phases is 120° based on the operating principles of the three-phase inverter. Thus, once the rotor position information of one phase is obtained by the sliding mode estimating circuit, corresponding first U-shaped wave modulation waves of the remaining two phases may be obtained by regulating the angular velocity signal and the phase difference. In this way, the phase difference between every two first U-shaped modulation waves of three phases is 120°. Similarly, for phases B and C, the corresponding PWM control signals can also be obtained in the same fashion.

As shown in FIG. 1, the PWM control signals may be used to respectively control the turn on and off of the switches in the three-phase inverter, in order to control the operating current of the PMSM to be a sine wave current. Thus in certain embodiments, the back electromotive force information that represents the rotor position information of the phase A may be obtained by sampling the phase voltage and the phase current of the phase A. Angular velocity signal ω obtained according to the back electromotive force information may be used to generate U-shaped modulation waves of three phases, so as to generate switching control signals for controlling the switches in the three-phase inverter, and to achieve a sine wave current. In this way, the rotor position information of the other two phases can be deduced by sampling the phase voltage and phase current of one phase, instead of using a position sensor to detect the rotor position information.

Figure 4:
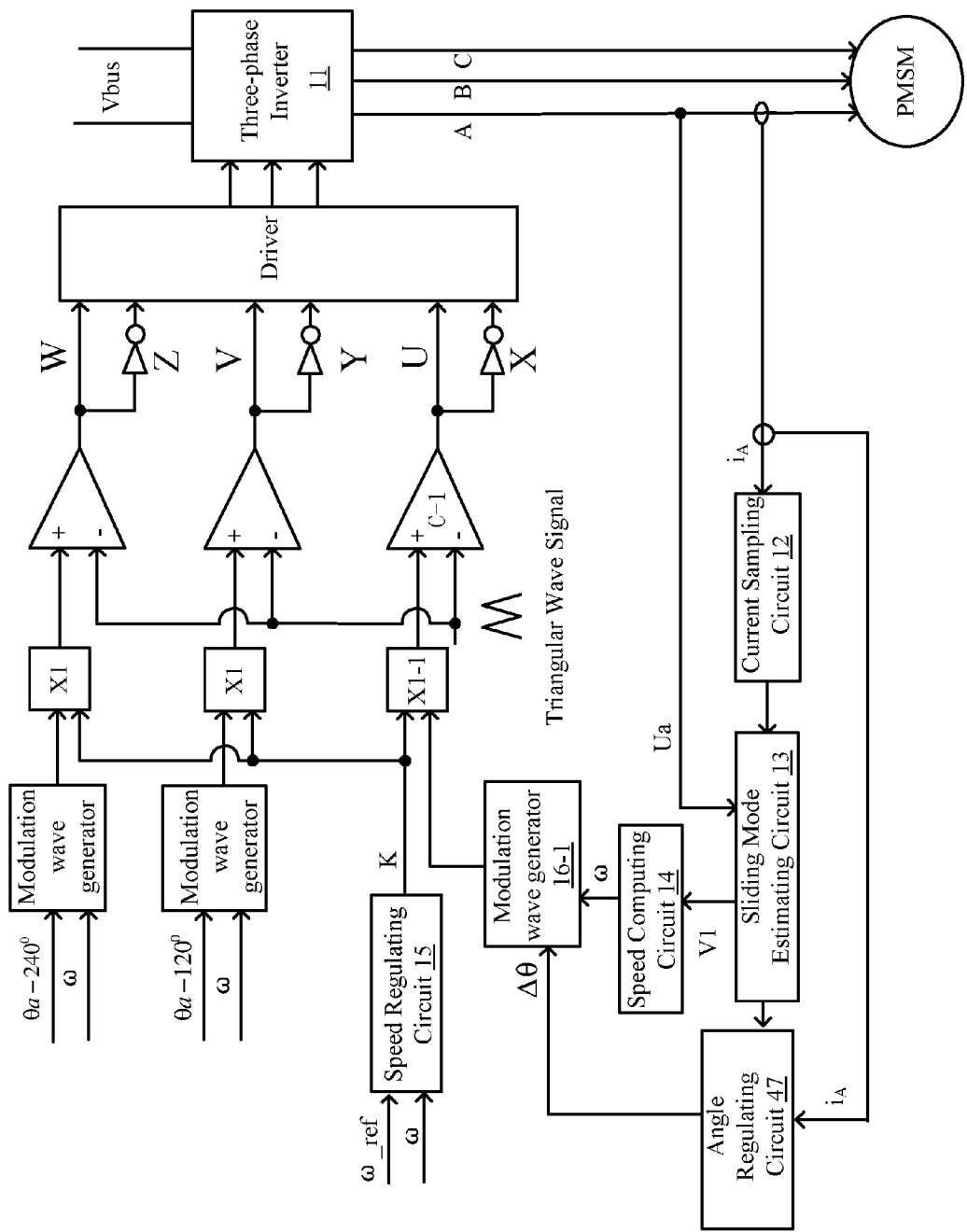
FIG. 4 is a schematic block diagram of a second example driving circuit for a permanent magnet synchronous motor, in accordance with embodiments of the present invention.

Referring now to FIG. 4, shown is a schematic block diagram of a second example driving circuit for a permanent magnet synchronous motor, in accordance with embodiments of the present invention. In order to improve the system efficiency, the torque obtainable per ampere of the stator current should be controlled as maximum. This example driving circuit also includes angular regulating circuit 47, which can receive voltage signal V1 and rotor current $i_A$ of a corresponding phase (e.g., phase A), and may calculate the angle difference Δθ between voltage signal V1 and the rotor current, in order to obtain angle difference signal Δθ for the modulation wave generating circuit of the phase A. The modulation wave generator may be used to regulate (e.g., shift left or shift right) the start time of the first U-shaped modulation wave according to the angle difference signal, so as to keep the phase of the U-shaped modulation wave consistent with the phase current, in order to achieve the maximum torque obtainable per ampere of the stator current.

Figure 5:
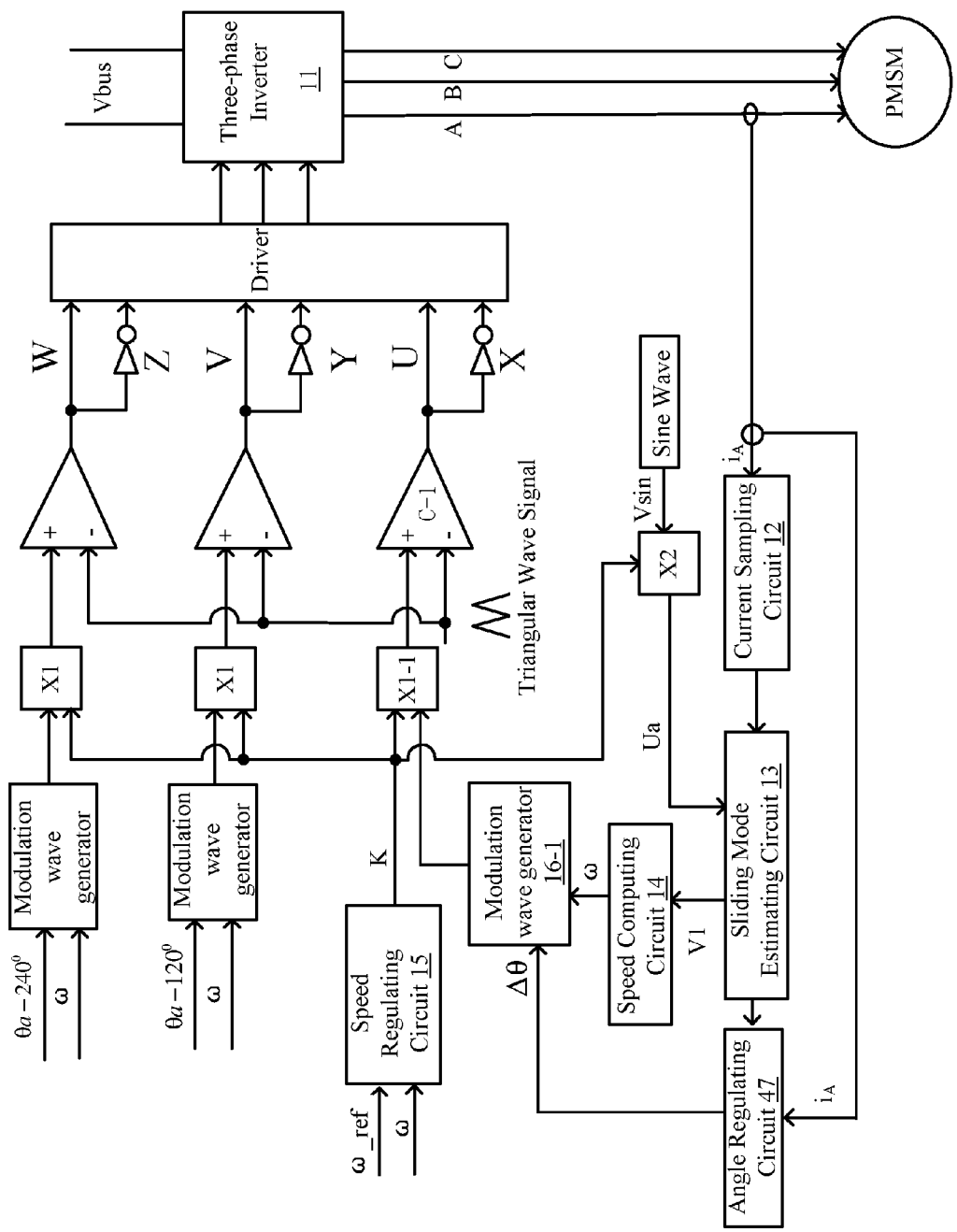
FIG. 5 is a schematic block diagram of a third example driving circuit for a permanent magnet synchronous motor, in accordance with embodiments of the present invention.

Referring now to FIG. 5, shown is a schematic block diagram of a third example driving circuit for a permanent magnet synchronous motor, in accordance with embodiments of the present invention. Here, the voltage sampling signal can be obtained by calculation. In this example, the driving circuit may also include multiplication circuit X2 that can receive sine wave signal Vsin and proportion signal K, and may generate voltage sampling signal Ua after a multiplication operation, where the phases of the sine wave signal and the first U-shaped modulation wave are the same. Voltage sampling signal Ua may be in direct proportion to the voltage signal sampled above (e.g., the proportion factor may be K/Vbus).

With the above described driving circuit for the permanent magnet synchronous motor, in certain embodiments, the back electromotive force that represents the rotor position information may be obtained by sampling the phase voltage and the phase current of a corresponding phase. The U-shaped modulation waves of three phases may be obtained according to the back electromotive force information for controlling the switches of the three-phase inverter, and to achieve a sine wave current. In this way, the rotor position information of other two phases can be obtained by sampling the phase voltage and phase current of one phase, instead of using a position sensor to detect the rotor position information.

Also in particular embodiments, a driving method for a PMSM, which controls the operating current of the PMSM by controlling the switching states of the switches in the three-phase inverter, can be provided. The driving method may include sampling a current through a rotor of one phase of the PMSM, to obtain a current sampling signal. The driving method may also include receiving the current sampling signal and a voltage sampling signal that represents a rotor voltage of the same phase, and estimating the back electromotive force information thereof, in order to generate a voltage signal that represents the back electromotive force information. The voltage signal can be received, and an angular velocity signal that represents the state cycle information can be generated. Also, a PWM control signal can be generated according to the angular velocity signal to control the turn on and off of the switches in the three-phase inverter, and to control the operating current of the PMSM to be a sine wave current.

The generation of the PWM control signal may include receiving the angular velocity signal and a reference angular velocity signal, and generating a proportion signal. Generating the PWM control signal can also include generating a first U-shaped modulation wave according to the angular velocity signal, where the phase difference between every two first U-shaped modulation wave of three phases is 120°. The first U-shaped modulation wave can be multiplied by the proportion signal, and a second U-shaped modulation wave can be generated. The second U-shaped modulation wave can be compared against a triangular wave signal, and a PWM control signal of a corresponding phase can be generated.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A driving circuit of a permanent magnet synchronous motor (PMSM), the driving circuit comprising:
   a) a current sampling circuit configured to obtain a current sampling signal by sampling a rotor current of one phase of said PMSM;
   b) a sliding mode estimating circuit configured to receive said current sampling signal and a voltage sampling signal that represents a rotor voltage of said phase, to estimate a back electromotive force information of said phase, and to generate a first voltage signal that represents said back electromotive force information;
   c) a speed computing circuit configured to receive said first voltage signal, and to generate an angular velocity signal that represents rotor cycle information; and
   d) a pulse-width modulation (PWM) control circuit configured to generate a PWM control signal according to said angular velocity signal, wherein said PWM control signal is configured to control the turn on and off of switches in a three-phase inverter, to control an operating current of said PMSM to be a sine wave current.

2. The driving circuit of claim 1, wherein said PWM control circuit comprises:
   a) a speed regulating circuit configured to receive said angular velocity signal and a reference angular velocity signal, and to generate a proportion signal;
   b) a modulation wave generator configured to receive said angular velocity signal, and to generate a first U-shaped modulation wave;
   c) a first multiplication circuit configured to receive said first U-shaped modulation wave and said proportion signal, and to generate a second U-shaped modulation wave; and d) a switching signal generator configured to receive said second U-shaped modulation wave and a triangular wave signal, and to generate a PWM control signal for a corresponding phase.

3. The driving circuit of claim 2, wherein a phase difference between every two said first U-shaped modulation waves is 120°.

4. The driving circuit of claim 2, further comprising a second multiplication circuit configured to receive a sine wave signal and said proportion signal, and to generate said voltage sampling signal, wherein the phase of said sine wave signal is the same as the phase of said first U-shaped modulation wave.

5. The driving circuit of claim 1, further comprising an angle regulating circuit configured to generate an angle difference signal by calculating an angle difference between said first voltage signal and said rotor current of a corresponding phase.

6. The driving circuit of claim 1, wherein said voltage sampling signal is obtained by sampling rotor voltage information of a corresponding phase that is the same phase as the phase for sampling said rotor current.

7. A driving method for a permanent magnet synchronous motor (PMSM), the method comprising:
   a) generating a current sampling signal by sampling a rotor current of one phase of the PMSM;
   b) generating a first voltage signal that represents back electromotive force information of said phase based on said current sampling signal and a voltage sampling signal that represents a rotor voltage of said phase;
   c) generating an angular velocity signal that represents rotor cycle information based on said first voltage signal; and
   d) generating a pulse-width modulation (PWM) control signal according to said angular velocity signal to control the turn on and off of switches in a three-phase inverter, and to control an operating current of said PMSM to be a sine wave current.

8. The method of claim 7, wherein said generating said PWM control signal comprises:
   a) generating a proportion signal using said angular velocity signal and a reference angular velocity signal;
   b) generating a first U-shaped modulation wave according to said angular velocity signal, wherein the phase difference between every two said first U-shaped modulation waves of three phases is 120°;
   c) generating a second U-shaped modulation wave by multiplying said first U-shaped modulation wave by said proportion signal; and
   d) generating a PWM control signal of a corresponding phase by comparing said second U-shaped modulation wave against a triangular wave signal.

9. The method of claim 8, further comprising receiving, by a second multiplication circuit, a sine wave signal and said proportion signal, and generating said voltage sampling signal, wherein the phase of said sine wave signal is the same as the phase of said first U-shaped modulation wave.

10. The method of claim 7, further comprising generating, by an angle regulating circuit, an angle difference signal by calculating an angle difference between said first voltage signal and said rotor current of a corresponding phase.

11. The method of claim 7, further comprising generating said voltage sampling signal sampling rotor voltage information of a corresponding phase that is the same phase as the phase for sampling said rotor current.

* * * * *